United States Patent
Kang et al.

(10) Patent No.: US 8,718,693 B2
(45) Date of Patent: May 6, 2014

(54) APPARATUS AND METHOD FOR SHARING FREQUENCY

(75) Inventors: Hyunduk Kang, Daejeon (KR); Heon Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 231 days.

(21) Appl. No.: 12/938,611

(22) Filed: Nov. 3, 2010

(65) Prior Publication Data

US 2011/0143798 A1     Jun. 16, 2011

(30) Foreign Application Priority Data

Dec. 16, 2009  (KR) .................. 10-2009-0125366
Feb. 17, 2010  (KR) .................. 10-2010-0014128

(51) Int. Cl.
*H04B 7/00*     (2006.01)
*H04W 4/00*    (2009.01)

(52) U.S. Cl.
USPC ....................... 455/509; 455/522; 370/329

(58) Field of Classification Search
USPC .......... 455/63.1, 552, 509, 517, 67.11, 452.2, 455/3.01, 450, 446, 452.1, 296; 370/328, 370/343, 329, 509
See application file for complete search history.

(56) References Cited

U.S. PATENT DOCUMENTS

| | | | |
|---|---|---|---|
| 6,466,793 B1* | 10/2002 | Wallstedt et al. | 455/450 |
| 2008/0268892 A1 | 10/2008 | Hamdi et al. | |
| 2009/0197627 A1* | 8/2009 | Kuffner et al. | 455/522 |
| 2009/0247201 A1 | 10/2009 | Ye et al. | |
| 2009/0279626 A1* | 11/2009 | Wang | 375/260 |
| 2010/0093364 A1* | 4/2010 | Ribeiro et al. | 455/452.2 |
| 2010/0303026 A1* | 12/2010 | Chaudhri et al. | 370/329 |
| 2011/0021153 A1* | 1/2011 | Safavi | 455/63.1 |
| 2011/0032892 A1* | 2/2011 | Bahl et al. | 370/329 |

FOREIGN PATENT DOCUMENTS

KR  10-2009-0077622   7/2009
KR  10-2009-0125539  12/2009

OTHER PUBLICATIONS

Seong Yeong Lee et al. "*Cooperative network management in cognitive radio network assisted satellite*", IEICE Technical Report, vol. 109, No. 254, Oct. 29-30, 2009.

* cited by examiner

*Primary Examiner* — Andrew Wendell
*Assistant Examiner* — Cindy Trandai
(74) *Attorney, Agent, or Firm* — Staas & Halsey LLP

(57) ABSTRACT

An apparatus and method for sharing a frequency are provided. A cognitive wireless communication device having a minimum ROI may be selected from among a plurality of cognitive wireless communication devices, and an idle frequency of a primary system may be allocated to the selected cognitive wireless communication device, thereby increasing an opportunistic utilization efficiency of the idle frequency.

10 Claims, 4 Drawing Sheets

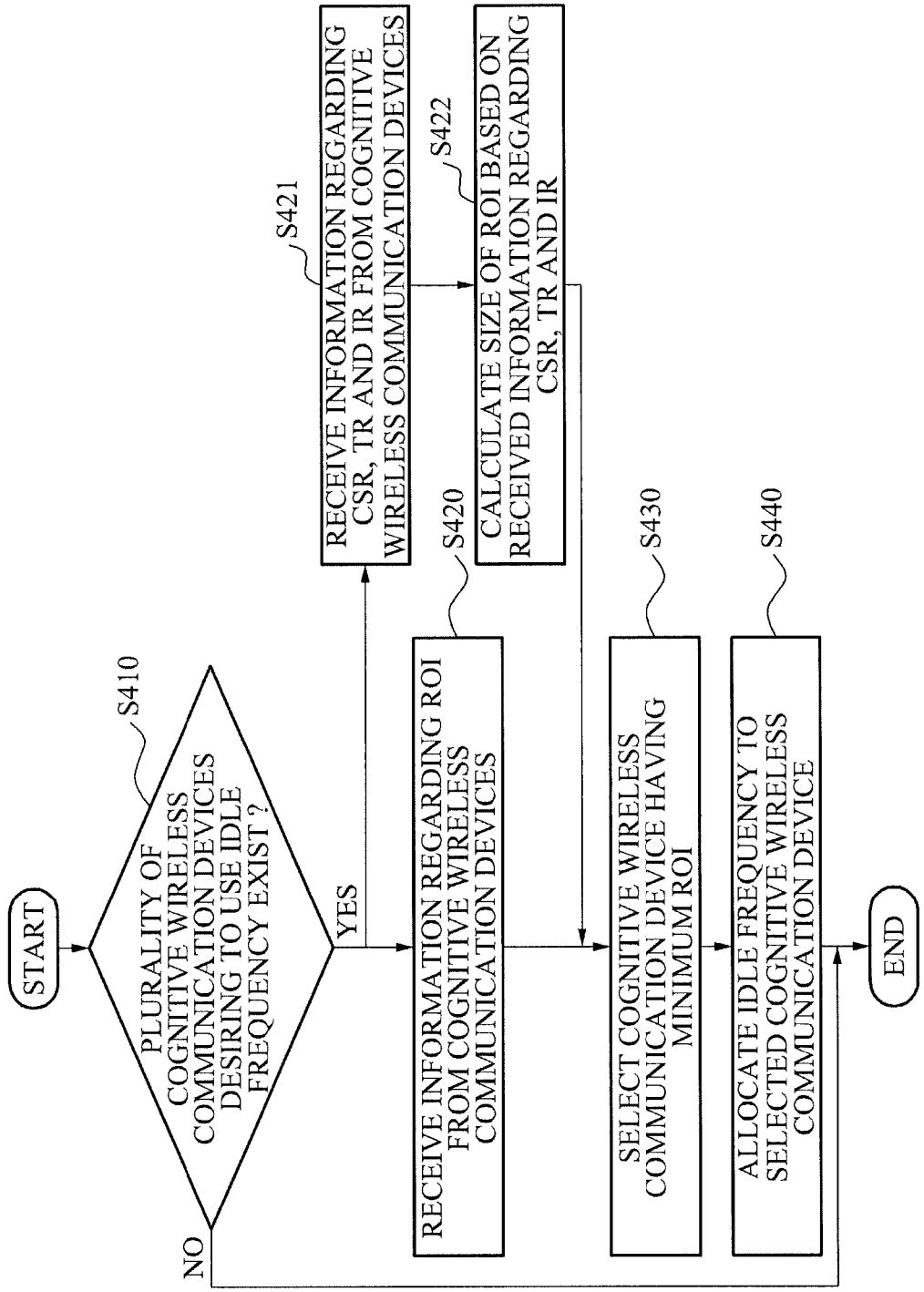

APPARATUS AND METHOD FOR SHARING FREQUENCY

CROSS-REFERENCE TO RELATED APPLICATIONS

This application claims the benefit of Korean Patent Application No. 10-2009-0125366 and of Korean Patent Application No. 10-2010-0014128, respectively filed on Dec. 16, 2009 and Feb. 17, 2010, in the Korean Intellectual Property Office, the disclosures of which are incorporated herein by reference.

BACKGROUND

1. Field of the Invention

The present invention relates to an apparatus and method for sharing a frequency, and more particularly, to an apparatus and method for sharing a frequency that may increase an opportunistic utilization efficiency of an idle frequency of a primary system of a cognitive wireless communication device.

2. Description of the Related Art

To increase a frequency utilization efficiency in a frequency band in use, a cognitive wireless technology includes a spectrum overlay sharing technology where a secondary system uses an idle frequency that is not used temporally and/or spatially in a frequency band of a primary system, without interfering with the primary system.

Since the cognitive wireless technology enables opportunistic use of a frequency band, it is possible to solve a frequency resource depletion problem where frequency resources are increasingly limited due to an advent of new wireless communication services and developments in radio communication technology.

In other words, it is important to develop a technology of increasing an opportunistic utilization efficiency of an idle frequency in the cognitive wireless technology.

Accordingly, there is a desire for a method to increase an opportunistic utilization efficiency of an idle frequency of a cognitive wireless communication device.

SUMMARY

An aspect of the present invention provides a method of selecting a cognitive wireless communication device having a minimum Range of Interference (ROI) from among a plurality of cognitive wireless communication devices, and allocating an idle frequency of a primary system to the selected cognitive wireless communication device, thereby increasing an opportunistic utilization efficiency of the idle frequency.

According to an aspect of the present invention, there is provided an apparatus for sharing a frequency, the apparatus including a receiver to receive information regarding a Range of Interference (ROI) from a plurality of cognitive wireless communication devices, when the plurality of cognitive wireless communication devices desire to use an idle frequency of a primary system; and a frequency allocator to select a cognitive wireless communication device having a minimum ROI from among the plurality of cognitive wireless communication devices based on the received information regarding the ROI, and to allocate the idle frequency to the selected cognitive wireless communication device.

According to another aspect of the present invention, there is provided a method of sharing a frequency, the method including receiving information regarding an ROI from a plurality of cognitive wireless communication devices, when the plurality of cognitive wireless communication devices desire to use an idle frequency of a primary system; selecting a cognitive wireless communication device having a minimum ROI from among the plurality of cognitive wireless communication devices based on the received information regarding the ROI; and allocating the idle frequency to the selected cognitive wireless communication device.

EFFECT

According to embodiments of the present invention, it is possible to select a cognitive wireless communication device having a minimum Range of Interference (ROI) from among a plurality of cognitive wireless communication devices, and to allocate an idle frequency of a primary system to the selected cognitive wireless communication device, thereby increasing an opportunistic utilization efficiency of the idle frequency.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating a method of sharing a frequency according to an embodiment of the present invention.

DETAILED DESCRIPTION

Figure 1:
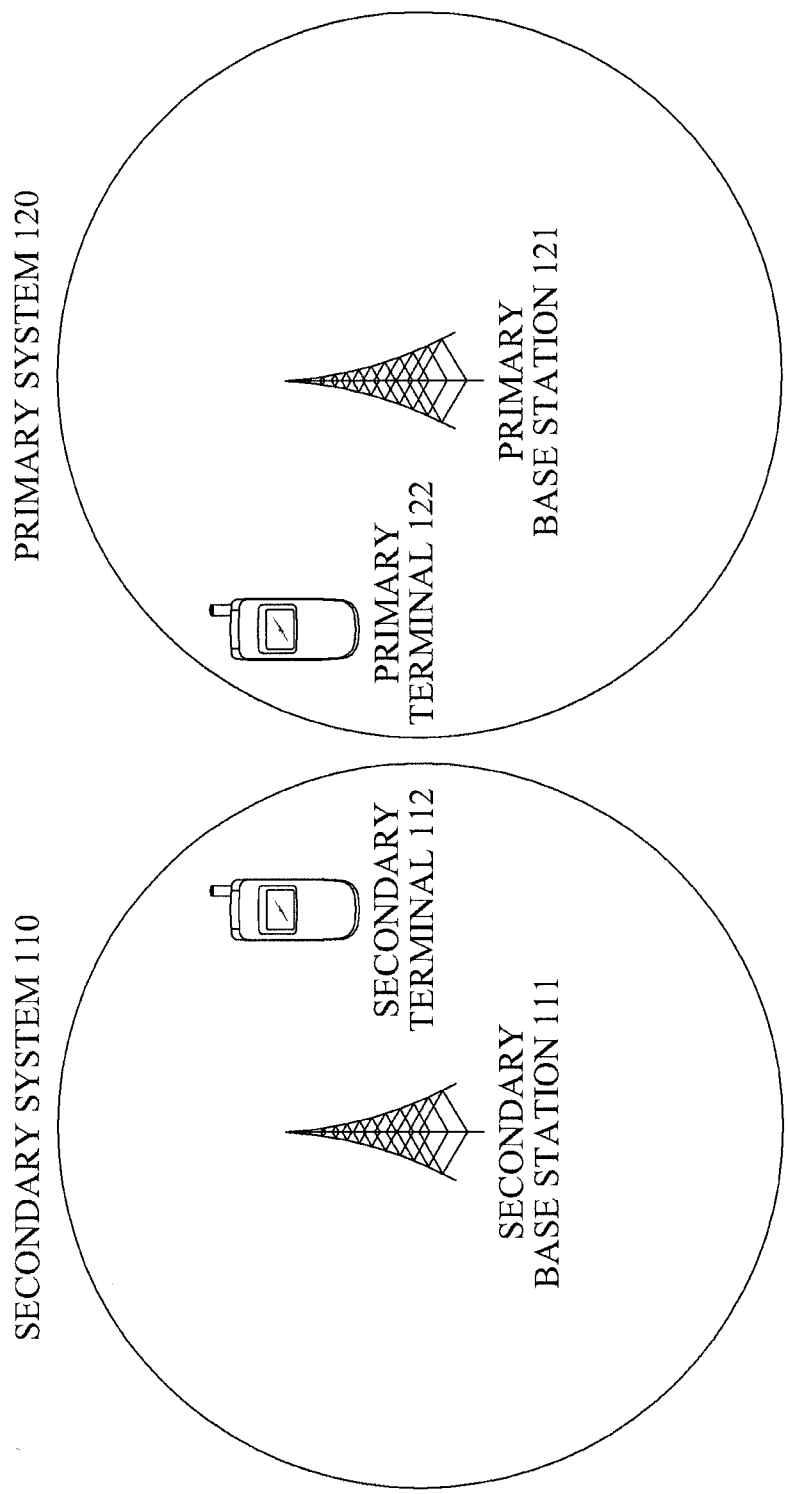
FIG. 1 is a diagram illustrating a primary system and a secondary system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a primary system 120 and a secondary system 110 according to an embodiment of the present invention.

Referring to FIG. 1, the secondary system 110 includes a secondary base station 111, and a secondary terminal 112. The primary system 120 includes a primary base station 121, and a primary terminal 122.

The secondary system 110 may determine a part of or all of frequency resources allocated to the primary system 120 to be available, using a cognitive wireless technology. The secondary base station 111 and the secondary terminal 112 in the secondary system 110 may transmit/receive data using the frequency resources determined to be available. Hereinafter, all communication devices contained in the secondary system 110, for example the secondary base station 111 and the secondary terminal 112, may be referred to as "cognitive wireless communication devices".

Information may need to be exchanged between the primary base station 121 and the primary terminal 122, so that the cognitive wireless communication devices may use an idle frequency of the primary system 110.

When an identical frequency resource is used by the primary system 120 and the secondary system 110, the primary system 120 and the secondary system 110 may collide with each other. However, the primary system 120 may have a higher priority for the allocated frequency resources than the secondary system 110.

Specifically, the secondary system 110 may use a part of or all of the frequency resources allocated to the primary system 120, without interrupting a communication operation of the primary system 120. The secondary base station 111 and the secondary terminal 112 may sense a signal of the primary system 120, and may perform data communication based on the sensed signal. For example, when the signal of the primary system 120 does not exist, or when a level of an interference in the primary system 120 by the data communication of the secondary base station 111 and the secondary terminal 112 is equal to or less than a predetermined level, the secondary base station 111 and the secondary terminal 112 may use a part of or all of the frequency resources allocated to the primary system 120.

Figure 2:
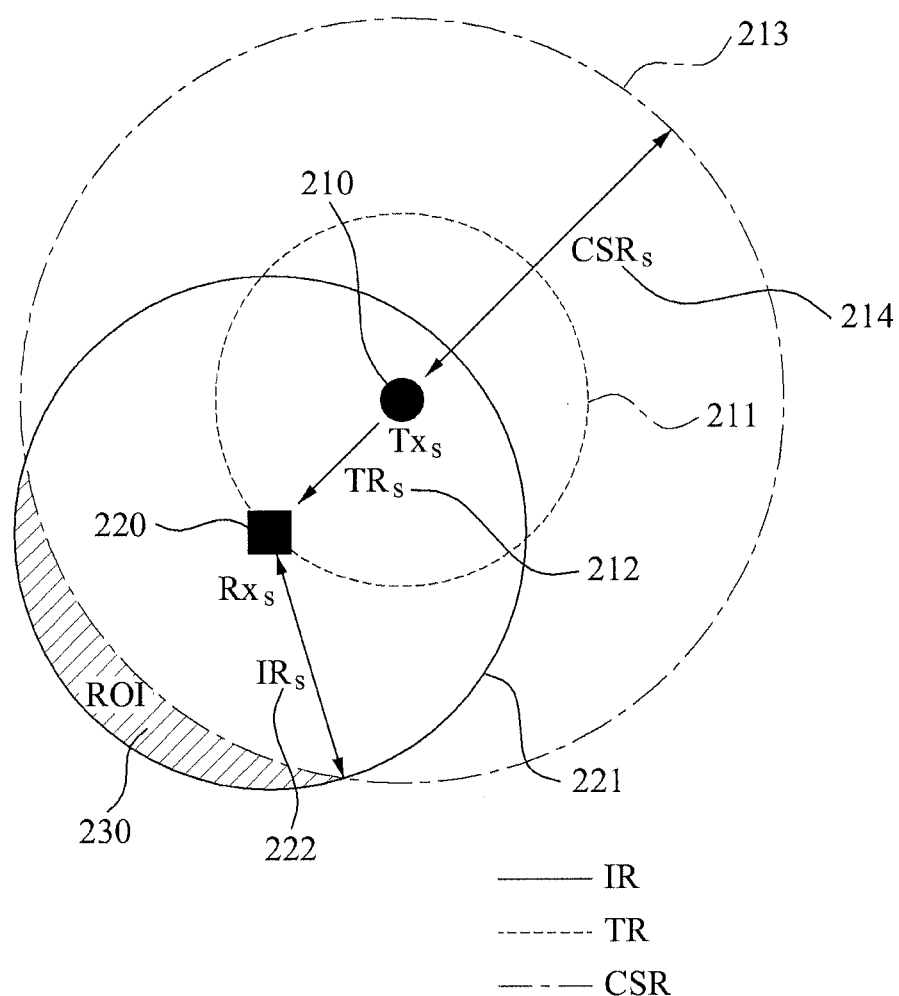
FIG. 2 is a diagram illustrating a secondary system according to an embodiment of the present invention.

FIG. 2 is a diagram illustrating a secondary system 200 according to an embodiment of the present invention.

Referring to FIG. 2, the secondary system 200 includes a secondary transmitter 210, and a secondary receiver 220. Depending on embodiments, the secondary transmitter 210 may function as a secondary base station of the secondary system 200, and the secondary receiver 220 may function as a secondary terminal of the secondary system 200. Cognitive wireless communication devices may be all communication devices, such as the secondary transmitter 210 and the secondary receiver 220 in the secondary system 200.

The secondary transmitter 210 may have a Transmission Range (TR) 211, and a Carrier Sensing Range (CSR) 213.

The TR 211 may be a range that enables the secondary transmitter 210 to transmit data to the secondary receiver 220 in the secondary system 200. Depending on embodiments, the TR 211 may have a circular shape, and the secondary transmitter 210 may be located at a center of the TR 211. Here, a maximum distance of the TR 211 may be represented as a Transmission Range of Secondary Transmitter $(TR_S)$ 212 as illustrated in FIG. 2.

The CSR 213 may be a range that enables the secondary transmitter 210 to sense a signal of a primary system. Depending on embodiments, the secondary transmitter 210 may sense whether another transmitter exists in the CSR 213. Depending on embodiments, the CSR 213 may have a circular shape, and the secondary transmitter 210 may be located at a center of the CSR 213. Here, a maximum distance of the CSR 213 may be represented as a Carrier Sensing Range of Secondary Transmitter $(CSR_S)$ 214 in FIG. 2.

The secondary receiver 220 may have an Interference Range (IR) 221.

The IR 221 may be a range that enables the secondary receiver 220 to communicate data with the secondary transmitter 210 without any interference by transmitters other than the secondary transmitter 210. For example, to perform data communication between the secondary receiver 220 and the secondary transmitter 210 without interference, another transmitter should not exist in the IR 221. Depending on embodiments, the IR 221 may have a circular shape, and the secondary receiver 220 may be located at a center of the IR 221. Here, a maximum distance of the IR 221 may be represented as an Interference Range of Secondary Transmitter $(IR_S)$ 222 in FIG. 2.

A Range of Interference (ROI) 230 may be within the IR 221 of the secondary receiver 220, and may be outside the CSR 213 of the secondary transmitter 210.

Since the ROI 230 is out of the CSR 213 of the secondary transmitter 210, another transmitter other than the secondary transmitter 210 may exist in the ROI 230. Additionally, since the ROI 230 is contained in the IR 221 of the secondary receiver 220, when another transmitter other than the secondary transmitter 210 exists in the IR 221, data communication between the secondary transmitter 210 and the secondary receiver 220 may fail due to an interference by the other transmitter. Thus, as the ROI 230 is reduced in size, a probability that the other transmitter may interfere with the data communication between the secondary transmitter 210 and the secondary receiver 220 may be reduced.

Figure 3:
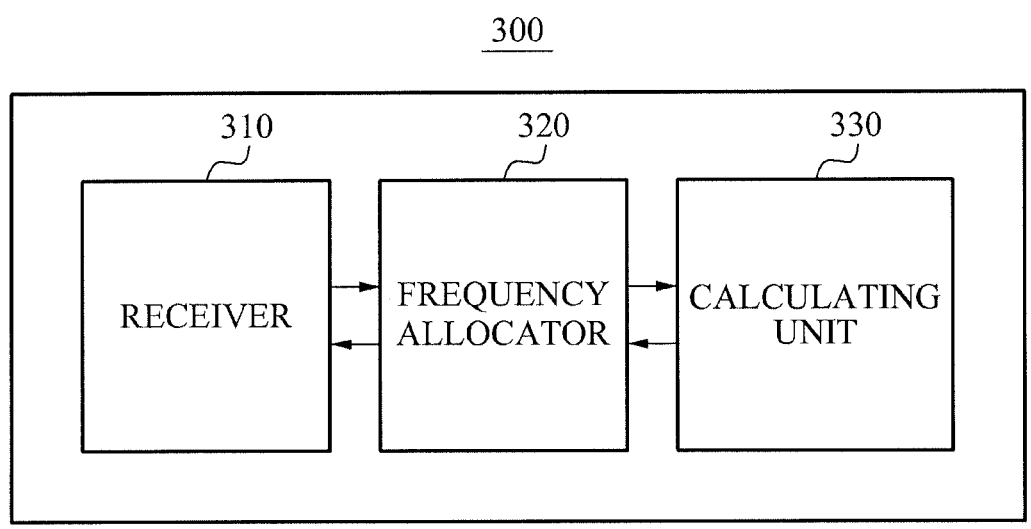
FIG. 3 is a block diagram illustrating a configuration of a frequency sharing apparatus according to an embodiment of the present invention.

FIG. 3 is a block diagram illustrating a configuration of a frequency sharing apparatus 300 according to an embodiment of the present invention.

Referring to FIG. 3, the frequency sharing apparatus 300 includes a receiver 310, and a frequency allocator 320.

The frequency sharing apparatus 300 may be inserted as a single module into cognitive wireless communication devices of a secondary system that desire to use an idle frequency of a primary system.

The receiver 310 may receive information regarding an ROI from a plurality of cognitive wireless communication devices, when the plurality of cognitive wireless communication devices desire to use an idle frequency of a primary system. Specifically, information regarding an ROI of each of the plurality of cognitive wireless communication devices may be received from each of the plurality of cognitive wireless communication devices.

Depending on embodiments, the information regarding the ROI may include information regarding a size and a location of the ROI, and the like.

The frequency allocator 320 may select at least one cognitive wireless communication device having a minimum ROI from among the plurality of cognitive wireless communication devices based on the information regarding the ROI received by the receiver 310. Additionally, the frequency allocator 320 may allocate the idle frequency of the primary system to the selected cognitive wireless communication device.

Depending on embodiments, a plurality of cognitive wireless communication devices may have a minimum ROI. Here, the frequency allocator 320 may select one cognitive wireless communication device from among the plurality of cognitive wireless communication devices having the minimum ROI, and may allocate the idle frequency to the selected cognitive wireless communication device.

According to an aspect of the present invention, the frequency sharing apparatus 300 may further include a calculating unit 330.

The calculating unit 330 may calculate a size of an ROI of each of the cognitive wireless communication devices.

Depending on embodiments, the receiver 310 may receive information regarding a CSR, information regarding a TR, and information regarding an IR from the plurality of cognitive wireless communication devices. Additionally, the calculating unit 330 may calculate the size of the ROI based on the information regarding the CSR, the information regarding the TR, and the information regarding the IR that are received by the receiver 310.

According to an aspect of the present invention, a portion of the plurality of cognitive wireless communication devices that desire to use the idle frequency of the primary system may transmit the information regarding the ROI to the frequency sharing apparatus 300, and the remaining portion may transmit the information regarding the CSR, the information regarding the TR, and the information regarding the IR to the frequency sharing apparatus 300.

When the information regarding the ROI is received from the cognitive wireless communication devices, the receiver 310 of the frequency sharing apparatus 300 may transmit the received information to the frequency allocator 320. When the information regarding the CSR, the information regarding the TR, and the information regarding the IR is received from the cognitive wireless communication devices, the receiver 310 may transmit the received information to the calculating unit 330. Depending on embodiments, the calculating unit 330 may calculate the size of the ROI of each of the cognitive wireless communication devices based on the received information regarding the CSR, the received information regarding the TR, and the received information regarding the IR, and may transmit the calculated value to the frequency allocator 320.

When a maximum distance of a CSR of a cognitive wireless communication device is identical to a maximum distance of an IR, the calculation unit 330 may calculate the size of the ROI using the following Equation 1:

$$ROI = \pi \cdot IR_5^2 - 2a^2 \cos^{-1}\left(\frac{TR_5}{2a}\right) - TR_5 \sqrt{a^2 - \left(\frac{TR_5}{2}\right)^2}.$$ [Equation 1]

In Equation 1, ROI denotes a size of an ROI of a cognitive wireless communication device, $TR_5$ denotes a maximum distance of a TR of a cognitive wireless communication device, $IR_5$ denotes a maximum distance of an IR of a cognitive wireless communication device, and $a=CSR_5=IR_5$ where $CSR_5$ denotes a maximum distance of a CSR of a cognitive wireless communication device.

When the maximum distance of the CSR is greater than the maximum distance of the IR, the calculating unit 330 may calculate different sizes of the ROI based on a maximum distance of a TR of a cognitive wireless communication device.

Depending on embodiments, the calculating unit 330 may classify a maximum distance of a TR of a cognitive wireless communication device into four cases below, and may calculate different sizes of the ROI for each case. Here, the maximum distance of the TR may be represented as "$TR_5$."

When the first case is for $0 \leq TR_5 < (IR_5 - CSR_5)$, the calculating unit 330 may calculate the size of the ROI to be a value of "0".

When the second case is for $$(IR_5 - CSR_5) < TR_5 < IR_5 \cdot \cos\left(\sin^{-1}\frac{CSR_5}{IR_5}\right),$$

the calculating unit 330 may calculate the size of the ROI using the following Equation 2:

$$ROI = \pi \cdot IR_5^2 - CSR_5^2 \cdot \beta +$$ [Equation 2]
$$IR_5^2 \cdot \alpha - \frac{1}{2}(IR_5^2 \sin 2\alpha - CSR_5^2 \sin 2(\pi - \beta)).$$

In Equation 2, ROI denotes a size of an ROI of a cognitive wireless communication device, $$\alpha = \sin^{-1}\left(\frac{2\sqrt{s(s-CSR_5)(s-IR_5)(s-TR_5)}}{CSR_5 TR_5}\right),$$

$$\beta = \sin^{-1}\left(\frac{2\sqrt{s(s-CSR_5)(s-IR_5)(s-TR_5)}}{IR_5 TR_5}\right),$$

and $$s = \frac{CSR_5 + IR_5 + TR_5}{2}.$$

When the third case is for $$IR_5 \cdot \cos\left(\sin^{-1}\frac{CSR_5}{IR_5}\right) \leq TR_5 < (CSR_5 + IR_5),$$

the calculating unit 330 may calculate the size of the ROI using the following Equation 3:

$$ROI =$$ [Equation 3]
$$\pi \cdot IR_5^2 - CSR_5^2 \cdot \beta + IR_5^2 \cdot \alpha - \frac{1}{2}(IR_5^2 \sin 2\alpha + CSR_5^2 \sin 2\beta).$$

When the fourth case is for $(CSR_5 + IR_5) \leq TR_5$, the calculating unit 330 may calculate the size of the ROI using the following Equation 4:

$$ROI = \pi \cdot IR_5^2.$$ [Equation 4]

FIG. 4 is a flowchart illustrating a method of sharing a frequency according to an embodiment of the present invention.

Referring to FIG. 4, in operation S410, whether there are a plurality of cognitive wireless communication devices desiring to use an idle frequency of a primary system may be determined.

When a single cognitive wireless communication device desires to use the idle frequency of the primary system, the idle frequency may be allocated to the cognitive wireless communication device.

In operation S420, when the plurality of cognitive wireless communication devices desire to use the idle frequency of the primary system, information regarding an ROI may be received from the plurality of cognitive wireless communication devices.

In operation S421, information regarding a CSR, information regarding a TR, and information regarding an IR may be received from the plurality of cognitive wireless communication devices.

In operation 422, a size of the ROI of each of the cognitive wireless communication devices may be calculated based on the received information regarding the CSR, the received information regarding the TR, and the received information regarding the IR.

When a maximum distance of a CSR of a cognitive wireless communication device is identical to a maximum distance of an IR, the size of the ROI may be calculated using the following Equation 5:

$$ROI = \pi \cdot IR_5^2 - 2a^2 \cos^{-1}\left(\frac{TR_5}{2a}\right) - TR_5 \sqrt{a^2 - \left(\frac{TR_5}{2}\right)^2}.$$ [Equation 5]

In Equation 5, ROI denotes a size of an ROI of a cognitive wireless communication device, $TR_5$ denotes a maximum distance of a TR of a cognitive wireless communication device, $IR_5$ denotes a maximum distance of an IR of a cognitive wireless communication device, and $a=CSR_5=IR_5$ where $CSR_5$ denotes a maximum distance of a CSR of a cognitive wireless communication device.

When the maximum distance of the CSR is greater than the maximum distance of the IR, different sizes of the ROI may be calculated based on a maximum distance of a TR of a cognitive wireless communication device.

Depending on embodiments, a maximum distance of a TR of a cognitive wireless communication device may be classified into four cases as below, and different sizes of the ROI may be calculated for each case. Here, the maximum distance of the TR may be represented as "$TR_5$."

When the first case is for $0 \leq TR_5 < (IR_5 - CSR_5)$, the size of the ROI may be calculated to be a value of "0".

When the second case is for $$(IR_5 - CSR_5) < TR_5 < IR_5 \cdot \cos\left(\sin^{-1}\frac{CSR_5}{IR_5}\right),$$

the size of the ROI may be calculated using the following Equation 6:

$$ROI = \pi \cdot IR_5^2 - CSR_5^2 \cdot \beta + IR_5^2 \cdot \alpha - \frac{1}{2}(IR_5^2 \sin 2\alpha + CSR_5^2 \sin 2(\pi - \beta)). \quad \text{[Equation 6]}$$

In Equation 6, ROI denotes a size of an ROI of a cognitive wireless communication device, $$\alpha = \sin^{-1}\left(\frac{2\sqrt{3(3-CSR_5)(3-IR_5)(3-TR_5)}}{CSR_5 TR_5}\right),$$

$$\beta = \sin^{-1}\left(\frac{2\sqrt{s(s-CSR_5)(s-IR_5)(s-TR_5)}}{IR_5 TR_5}\right),$$

and $$s = \frac{CSR_5 + IR_5 + TR_5}{2}.$$

When the third case is for $$IR_5 \cdot \cos\left(\sin^{-1}\frac{CSR_5}{IR_5}\right) \leq TR_5 < (CSR_5 + IR_5),$$

the size of the ROI may be calculated using the following Equation 7:

$$ROI = \quad \text{[Equation 7]}$$
$$\pi \cdot IR_5^2 - CSR_5^2 \cdot \beta + IR_5^2 \cdot \alpha - \frac{1}{2}(IR_5^2 \sin 2\alpha + CSR_5^2 \sin 2\beta).$$

When the fourth case is for $(CSR_5 + IR_5) \leq TR_5$, the size of the ROI may be calculated using the following Equation 8:

$$ROI = \pi \cdot IR_5^2. \quad \text{[Equation 8]}$$

In operation S430, a cognitive wireless communication device having a minimum ROI may be selected from among the plurality of cognitive wireless communication devices. Here, the minimum ROI may be received or calculated. When a plurality of cognitive wireless communication devices have the minimum ROI, one cognitive wireless communication device may be selected from among the plurality of cognitive wireless communication devices having the minimum ROI.

In operation S440, the idle frequency may be allocated to the selected cognitive wireless communication device.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for sharing a frequency, the apparatus comprising:
    a receiver to receive information regarding a Range of Interference (ROI) from a plurality of cognitive wireless communication devices, when the plurality of cognitive wireless communication devices desire to use an idle frequency of a primary system; and
    a frequency allocator to select a cognitive wireless communication device having a ROI of minimum size from among the plurality of cognitive wireless communication devices based on the received information regarding the ROI, and to allocate the idle frequency to a secondary system including the selected cognitive wireless communication device,
    wherein the ROI is a region within an Interference Range (IR) of the cognitive wireless communication device as a secondary receiver in the secondary system and outside a Carrier Sensing Range (CSR) of another cognitive wireless communication device as a secondary transmitter in the secondary system.

2. The apparatus of claim 1, further comprising:
    a calculation unit to calculate a size of the ROI,
    wherein the receiver receives information regarding a Carrier Sensing Range (CSR), information regarding a Transmission Range (TR), and information regarding an Interference Range (IR) from the plurality of cognitive wireless communication devices, and wherein the calculator calculates the size of the ROI based on the received information regarding the CSR, the received information regarding the TR, and the received information regarding the IR.

3. An apparatus for sharing a frequency, the apparatus comprising:

a receiver to receive information regarding a Range of Interference (ROI) from a plurality of cognitive wireless communication devices, when the plurality of cognitive wireless communication devices desire to use an idle frequency of a primary system;

a frequency allocator to select a cognitive wireless communication device having a minimum ROI from among the plurality of cognitive wireless communication devices based on the received information regarding the ROI, and to allocate the idle frequency to the selected cognitive wireless communication device; and a calculation unit to calculate a size of the ROI, wherein the receiver receives information regarding a Carrier Sensing Range (CSR), information regarding a Transmission Range (TR), and information regarding an Interference Range (IR) from the plurality of cognitive wireless communication devices, and wherein the calculator calculates the size of the ROI based on the received information regarding the CSR, the received information regarding the TR, and the received information regarding the IR, and wherein the calculation unit calculates the size of the ROI using the following Equation 1, when a maximum distance of the CSR is identical to a maximum distance of the IR:

$$ROI = \pi \cdot IR_5^2 - 2a^2\cos^{-1}\left(\frac{TR_5}{2a}\right) - TR_5\sqrt{a^2 - \left(\frac{TR_5}{2}\right)^2},\quad \text{[Equation 1]}$$

where ROI denotes a size of an ROI of a cognitive wireless communication device, $TR_5$ denotes a maximum distance of a TR of a cognitive wireless communication device, $IR_5$ denotes a maximum distance of an IR of a cognitive wireless communication device, and $a=CSR_5=IR_5$ where $CSR_5$ denotes a maximum distance of a CSR of a cognitive wireless communication device.

4. The apparatus of claim 2, wherein the calculation unit calculates different sizes of the ROI based on a maximum distance of the TR, when the maximum distance of the CSR is greater than the maximum distance of the IR.

5. An apparatus for sharing a frequency, the apparatus comprising:

a receiver to receive information regarding a Range of Interference (ROI) from a plurality of cognitive wireless communication devices, when the plurality of cognitive wireless communication devices desire to use an idle frequency of a primary system;

a frequency allocator to select a cognitive wireless communication device having a minimum ROI from among the plurality of cognitive wireless communication devices based on the received information regarding the ROI, and to allocate the idle frequency to the selected cognitive wireless communication device; and a calculation unit to calculate a size of the ROI, wherein the receiver receives information regarding a Carrier Sensing Range (CSR), information regarding a Transmission Range (TR), and information regarding an Interference Range (IR) from the plurality of cognitive wireless communication devices, and wherein the calculator calculates the size of the ROI based on the received information regarding the CSR, the received information regarding the TR, and the received information regarding the IR, and wherein the calculation unit calculates different sizes of the ROI based on a maximum distance of the TR, when the maximum distance of the CSR is greater than the maximum distance of the IR, and wherein the calculation unit calculates the size of the ROI to be a value of "0" when the maximum distance of the TR satisfies the following Equation 2:

$$0 \le TR_5 < (IR_5 - CSR_5),\quad \text{[Equation 2]}$$

where $TR_5$ denotes a maximum distance of a TR of a cognitive wireless communication device, $IR_5$ denotes a maximum distance of an IR of a cognitive wireless communication device, and $CSR_5$ denotes a maximum distance of a CSR of a cognitive wireless communication device.

6. An apparatus for sharing a frequency, the apparatus comprising:

a receiver to receive information regarding a Range of Interference (ROI) from a plurality of cognitive wireless communication devices, when the plurality of cognitive wireless communication devices desire to use an idle frequency of a primary system;

a frequency allocator to select a cognitive wireless communication device having a minimum ROI from among the plurality of cognitive wireless communication devices based on the received information regarding the ROI, and to allocate the idle frequency to the selected cognitive wireless communication device; and a calculation unit to calculate a size of the ROI, wherein the receiver receives information regarding a Carrier Sensing Range (CSR), information regarding a Transmission Range (TR), and information regarding an Interference Range (IR) from the plurality of cognitive wireless communication devices, and wherein the calculator calculates the size of the ROI based on the received information regarding the CSR, the received information regarding the TR, and the received information regarding the IR, and wherein the calculation unit calculates different sizes of the ROI based on a maximum distance of the TR, when the maximum distance of the CSR is greater than the maximum distance of the IR, and wherein the calculation unit calculates the size of the ROI using Equation 4 below when the maximum distance of the TR satisfies the following Equation 3:

$$(IR_5 - CSR_5) < TR_5 < IR_5 \cdot \cos\left(\sin^{-1}\frac{CSR_5}{IR_5}\right),\quad \text{[Equation 3]}$$

where $TR_5$ denotes a maximum distance of a TR of a cognitive wireless communication device, $IR_5$ denotes a maximum distance of an IR of a cognitive wireless communication device, and $CSR_5$ denotes a maximum distance of a CSR of a cognitive wireless communication device, and $$ROI = \pi \cdot IR_5^2 - CSR_5^2 \cdot \beta + \quad \text{[Equation 4]}$$
$$IR_5^2 \cdot \alpha - \frac{1}{2}(IR_5^2 \sin 2\alpha + CSR_5^2 \sin 2(\pi - \beta)),$$

where ROI denotes a size of an ROI of a cognitive wireless communication device, $$\alpha = \sin^{-1}\left(\frac{2\sqrt{s(s-CSR_5)(s-IR_5)(s-TR_5)}}{CSR_5 TR_5}\right),$$
$$\beta = \sin^{-1}\left(\frac{2\sqrt{s(s-CSR_5)(s-IR_5)(s-TR_5)}}{IR_5 TR_5}\right),$$
and
$$s = \frac{CSR_5 + IR_5 + TR_5}{2}.$$

7. An apparatus for sharing a frequency, the apparatus comprising:
a receiver to receive information regarding a Range of Interference (ROI) from a plurality of cognitive wireless communication devices, when the plurality of cognitive wireless communication devices desire to use an idle frequency of a primary system;
a frequency allocator to select a cognitive wireless communication device having a minimum ROI from among the plurality of cognitive wireless communication devices based on the received information regarding the ROI, and to allocate the idle frequency to the selected cognitive wireless communication device; and
a calculation unit to calculate a size of the ROI,
wherein the receiver receives information regarding a Carrier Sensing Range (CSR), information regarding a Transmission Range (TR), and information regarding an Interference Range (IR) from the plurality of cognitive wireless communication devices, and
wherein the calculator calculates the size of the ROI based on the received information regarding the CSR, the received information regarding the TR, and the received information regarding the IR, and
wherein the calculation unit calculates different sizes of the ROI based on a maximum distance of the TR, when the maximum distance of the CSR is greater than the maximum distance of the IR, and
wherein the calculation unit calculates the size of the ROI using Equation 6 below when the maximum distance of the TR satisfies the following Equation 5:

$$IR_5 \cdot \cos\left(\sin^{-1}\frac{CSR_5}{IR_5}\right) \leq TR_5 < (CSR_5 + IR_5), \quad \text{[Equation 5]}$$

where $TR_5$ denotes a maximum distance of a TR of a cognitive wireless communication device, $IR_5$ denotes a maximum distance of an IR of a cognitive wireless communication device, and $CSR_5$ denotes a maximum distance of a CSR of a cognitive wireless communication device, and $$ROI = \quad \text{[Equation 6]}$$
$$\pi \cdot IR_5^2 - CSR_5^2 \cdot \beta + IR_5^2 \cdot \alpha - \frac{1}{2}(IR_5^2 \sin 2\alpha + CSR_5^2 \sin 2\beta),$$

where ROI denotes a size of an ROI of a cognitive wireless communication device, $$\alpha = \sin^{-1}\left(\frac{2\sqrt{s(s-CSR_5)(s-IR_5)(s-TR_5)}}{CSR_5 TR_5}\right),$$
$$\beta = \sin^{-1}\left(\frac{2\sqrt{s(s-CSR_5)(s-IR_5)(s-TR_5)}}{IR_5 TR_5}\right),$$
and
$$s = \frac{CSR_5 + IR_5 + TR_5}{2}.$$

8. An apparatus for sharing a frequency, the apparatus comprising:
a receiver to receive information regarding a Range of Interference (ROI) from a plurality of cognitive wireless communication devices, when the plurality of cognitive wireless communication devices desire to use an idle frequency of a primary system;
a frequency allocator to select a cognitive wireless communication device having a minimum ROI from among the plurality of cognitive wireless communication devices based on the received information regarding the ROI, and to allocate the idle frequency to the selected cognitive wireless communication device; and
a calculation unit to calculate a size of the ROI,
wherein the receiver receives information regarding a Carrier Sensing Range (CSR), information regarding a Transmission Range (TR), and information regarding an Interference Range (IR) from the plurality of cognitive wireless communication devices, and
wherein the calculator calculates the size of the ROI based on the received information regarding the CSR, the received information regarding the TR, and the received information regarding the IR, and
wherein the calculation unit calculates different sizes of the ROI based on a maximum distance of the TR, when the maximum distance of the CSR is greater than the maximum distance of the IR, and
wherein the calculation unit calculates the size of the ROI using Equation 8 below when the maximum distance of the TR satisfies the following Equation 7:

$$(CSR_5 + IR_5) \leq TR_5, \quad \text{[Equation 7]}$$

where $TR_5$ denotes a maximum distance of a TR of a cognitive wireless communication device, $IR_5$ denotes a maximum distance of an IR of a cognitive wireless communication device, and $CSR_5$ denotes a maximum distance of a CSR of a cognitive wireless communication device, and $$ROI = \pi \cdot IR_5^2, \quad \text{[Equation 8]}$$

where ROI denotes a size of an ROI of a cognitive wireless communication device.

9. A method of sharing a frequency, the method comprising:
receiving, by a receiver, information regarding a Range of Interference (ROI) from a plurality of cognitive wireless communication devices, when the plurality of cognitive wireless communication devices desire to use an idle frequency of a primary system;

selecting a cognitive wireless communication device having a ROI of minimum size from among the plurality of cognitive wireless communication devices based on the received information regarding the ROI; and allocating the idle frequency to a secondary system including the selected cognitive wireless communication device, wherein the ROI is a region within an Interference Range (IR) of the cognitive wireless communication device as a secondary receiver in the secondary system and outside a Carrier Sensing Range (CSR) of another cognitive wireless communication device as a secondary transmitter in the secondary system.

10. The method of claim 9, further comprising:

receiving information regarding a CSR, information regarding a TR, and information regarding an IR from the plurality of cognitive wireless communication devices; and calculating a size of the ROI based on the received information regarding the CSR, the received information regarding the TR, and the received information regarding the IR.

* * * * *